United States Patent
Calciu et al.

(10) Patent No.: US 12,019,554 B2
(45) Date of Patent: Jun. 25, 2024

(54) SMART PREFETCHING FOR REMOTE MEMORY

(71) Applicant: VMware, Inc., Palo Alto, CA (US)

(72) Inventors: Irina Calciu, Palo Alto, CA (US); Andreas Nowatzyk, San Jose, CA (US); Isam Wadih Akkawi, Santa Clara, CA (US); Venkata Subhash Reddy Peddamallu, Sunnyvale, CA (US); Pratap Subrahmanyam, Saratoga, CA (US)

(73) Assignee: VMware LLC, Palo Alto, CA (US)

( * ) Notice: Subject to any disclaimer, the term of this patent is extended or adjusted under 35 U.S.C. 154(b) by 32 days.

(21) Appl. No.: 17/872,744

(22) Filed: Jul. 25, 2022

(65) Prior Publication Data

US 2023/0004497 A1    Jan. 5, 2023

Related U.S. Application Data

(63) Continuation of application No. 17/367,078, filed on Jul. 2, 2021, now Pat. No. 11,442,865.

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
None
See application file for complete search history.

(56) References Cited

U.S. PATENT DOCUMENTS

| 6,557,079 | B1 * | 4/2003 | Mason, Jr. | G06F 12/0862 |
| | | | | 711/113 |
| 10,733,110 | B1 * | 8/2020 | Volpe | G06F 3/0656 |
| 10,761,984 | B2 | 9/2020 | Calciu et al. | |
| 10,877,892 | B2 * | 12/2020 | Ray | G06F 9/45558 |
| 10,929,295 | B2 | 2/2021 | Gandhi et al. | |
| 2005/0071601 | A1 | 3/2005 | Luick | |
| 2006/0265552 | A1 * | 11/2006 | Davis | G06F 12/0862 |
| | | | | 711/137 |
| 2014/0089572 | A1 * | 3/2014 | Koka | G06F 12/1072 |
| | | | | 711/147 |

(Continued)

OTHER PUBLICATIONS

Aguilera, M. K. et al. "Remote regions: a simple abstraction for remote memory," 2018 USENIX Annual Technical Conference (ATC '18), Jul. 11-13, 2018, Boston, MA, USA, pp. 775-787.

Al Maruf, H. et al. "Effectively Prefetching Remote Memory with Leap," 2020 USENIX Annual Technical Conference (ATC '20), Jul. 15-17, 2020, pp. 843-857.

Amaro, E. et al. "Can Far Memory Improve Job Throughput?" Proceedings of the Fifteenth European Conference on Computer Systems (EuroSys '20), Apr. 27-30, 2020, Heraklion, Greece, 16 pages.

(Continued)

*Primary Examiner* — William E. Baughman
(74) *Attorney, Agent, or Firm* — Kim & Stewart LLP

(57) ABSTRACT

A method of prefetching memory pages from remote memory includes detecting that a cache-line access made by a processor executing an application program is an access to a cache line containing page table data of the application program, identifying data pages that are referenced by the page table data, initiating a fetch of a data page, which is one of the identified data pages, and starting a timer. If the fetch completes prior to expiration of the timer, the data page is stored in a local memory. On the other hand, if the fetch does not complete prior to expiration of timer, a presence bit of the data page in the page table data is set to indicate that the data page is not present.

20 Claims, 10 Drawing Sheets

(56) References Cited

U.S. PATENT DOCUMENTS

| | | | |
|---|---|---|---|
| 2015/0269111 A1* | 9/2015 | Bak | G06F 13/1663 |
| | | | 711/147 |
| 2015/0309936 A1* | 10/2015 | Hooker | G06F 12/0862 |
| | | | 711/137 |
| 2016/0197986 A1* | 7/2016 | Chambliss | G06F 9/45558 |
| | | | 709/213 |
| 2017/0024165 A1* | 1/2017 | Kazama | G06F 3/0659 |
| 2017/0103024 A1* | 4/2017 | Matsuo | G06F 12/123 |
| 2017/0133106 A1 | 5/2017 | Viswanathan Pillai et al. | |
| 2019/0188149 A1* | 6/2019 | Abhishek Raja | G06F 12/0891 |
| 2020/0034175 A1 | 1/2020 | Calciu et al. | |
| 2020/0034176 A1* | 1/2020 | Calciu | G06F 12/0815 |
| 2020/0034200 A1 | 1/2020 | Calciu et al. | |
| 2020/0034297 A1 | 1/2020 | Calciu et al. | |
| 2020/0242035 A1 | 7/2020 | Kolli et al. | |
| 2020/0242036 A1 | 7/2020 | Kolli et al. | |

OTHER PUBLICATIONS

Bhattacharjee, A. "Translation-Triggered Prefetching," Proceedings of the Twenty-Second International Conference on Architectural Support for Programming Languages and Operating Systems (ASPLOS '17), Apr. 8-12, 2017, pp. 63-76.

Gu, J. et al. "Efficient Memory Disaggregation with Infiniswap," 14th USENIX Symposium on Networked Systems Design and Implementation (NSDI '17), Mar. 27-29, 2017, Boston, MA, USA, pp. 649-667.

Wang, C. et al. "Semeru: A Memory-Disaggregated Managed Runtime," 14th USENIX Symposium on Operating Systems Design and Implementation (OSDI '20), Nov. 4-6, 2020, pp. 261-280.

* cited by examiner

SMART PREFETCHING FOR REMOTE MEMORY

CROSS-REFERENCE

This application is a continuation of U.S. patent application Ser. No. 17/367,078, filed Jul. 2, 2021, which application is incorporated by reference herein in its entirety.

BACKGROUND

Remote memory techniques have been employed to pool memory from multiple hosts connected via a fast network. Even though the network has high bandwidth and low latency, the cost of a remote memory access is still high relative to local memory accesses. To avoid delays in remote memory accesses, memory pages may be prefetched before they are accessed. Various prediction models have been developed to be employed in prefetching memory pages from a remote host, but they have generally been inadequate. What is needed is an improved way of prefetching memory pages from a remote host that is able to better predict what memory locations are to be accessed by application programs before they are actually accessed.

In addition, a fetch from remote memory is subject to certain failures because the fetch occurs over the network connecting the multiple hosts. The network can encounter delays, and the hosts for the remote memory can fail. In these cases, it is desirable to have a mechanism for guarding against these failures.

SUMMARY

A method of prefetching memory pages from remote memory, according to an embodiment, includes detecting that a cache-line access made by a processor executing an application program is an access to a cache line containing page table data of the application program, identifying data pages that are referenced by the page table data, initiating a fetch of a data page, which is one of the identified data pages, and starting a timer. If the fetch completes prior to expiration of the timer, the data page is stored in a local memory. On the other hand, if the fetch does not complete prior to expiration of timer, a presence bit of the data page in the page table data is set to indicate that the data page is not present.

Further embodiments include a device configured to carry out one or more aspects of the above method and a computer system configured to carry out one or more aspects of the above method.

DETAILED DESCRIPTION

To improve prefetching from remote memory, one or more embodiments herein allocate page tables of an application to an FPGA-attached memory to enable the FPGA to track all of the CPU accesses to cache lines containing page table data. When a CPU accesses a cache line containing page table data from the FPGA-attached memory, the FPGA uses this information to prefetch data pages referenced by the page table data from the remote memory into a local memory. A timer governs the prefetching to avoid machine check faults if a page does not arrive in time from the remote memory. In addition, the FPGA tracks cache-line accesses to the prefetched data pages and uses this data to prioritize and filter subsequent prefetches of data pages from remote memory and to clean up unused data pages from the local memory.

Figure 1A:
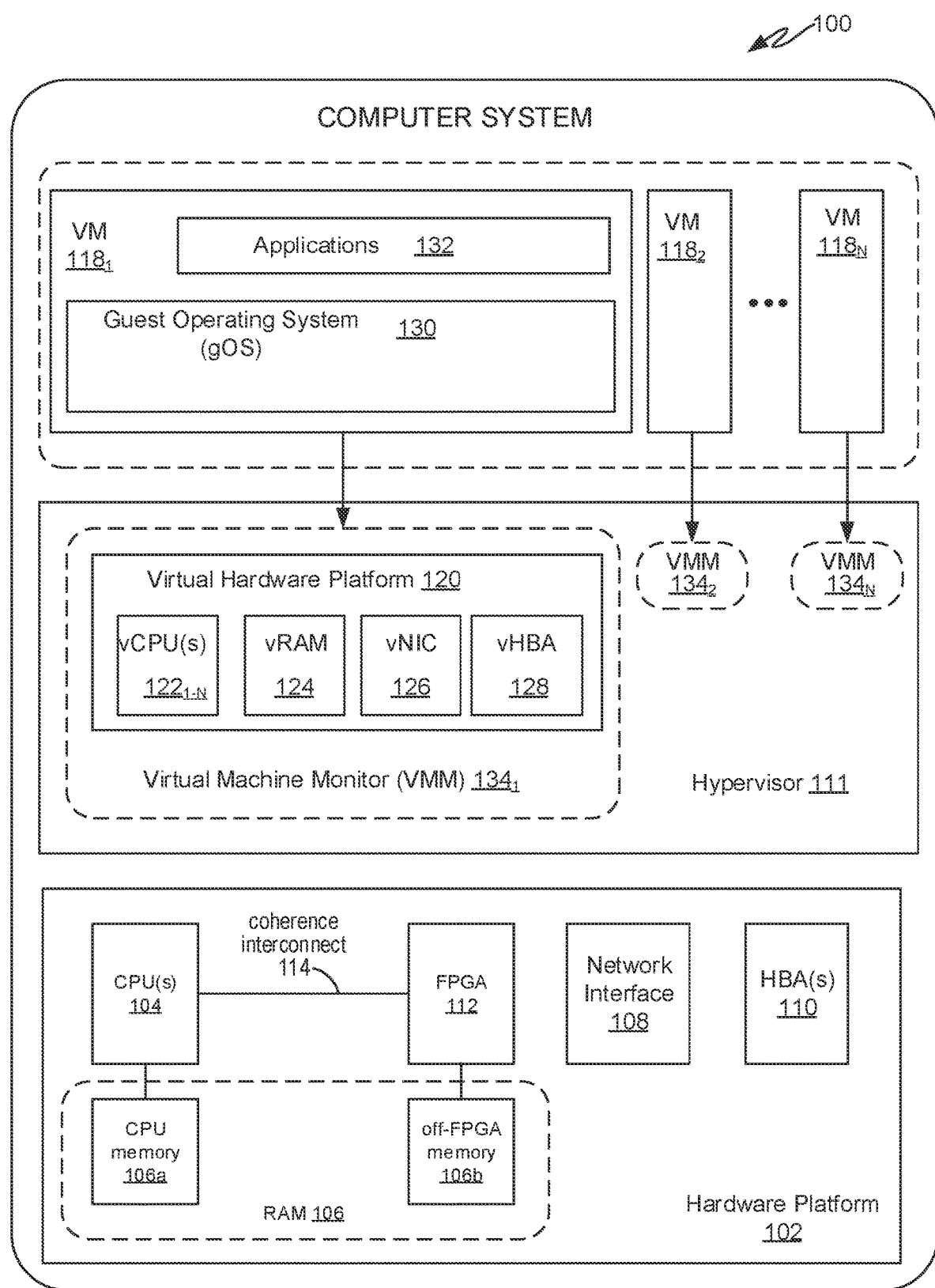
FIG. 1A depicts a block diagram of a computer system that is representative of a virtualized computer architecture in which embodiments may be implemented.

FIG. 1A is a block diagram of a computer system that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as central processing units (CPUs) 104, random access memory (RAM) 106 as system memory, one or more network interfaces 108 for connecting to a network, and one or more host bus adapters (HBA) 110 for connecting to a storage system. In addition, hardware platform 102 includes a field-programmable gate array (FPGA) 112, which is installed in a CPU socket and communicates with one or more CPUs 104 via coherence interconnect 114. Coherence interconnect 114 may be any point-to-point coherence interconnect between processors, such as the Intel® UltraPath Interconnect (UPI), which is a successor to the Intel® QuickPath Interconnect (QPI), which supports a cache coherence protocol. In another embodiment, coherence interconnect 114 is a Compute Express Link' (OM') operating with CXL-cache/mem protocols. Though the following description has the FPGA occupying a CPU socket, the embodiments are not so limited; any arrangement of the FGPA that includes a connection to the coherence interconnect among processors present in computer system 100 is sufficient.

A virtualization software layer, referred to hereinafter as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, CA. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a virtual hardware platform that is executed under the control of hypervisor 111, in particular the corresponding VMM $134_1$-$134_N$. For example, virtual hardware devices of VM $118_1$ in virtual hardware platform 120 include one or more virtual CPUs (vCPUs) 1221-122N, a virtual random access memory (vRAM) 124, a virtual network interface adapter (vNIC) 126, and virtual HBA (vHBA) 128. Virtual hardware platform 120 supports the installation of a guest operating system (guest OS) 130, on top of which applications 132 are executed in VM $118_1$. Examples of guest OS 130 include any of the well-known commodity operating systems, such as the Microsoft Windows® operating system, the Linux® operating system, and the like.

It should be recognized that the various terms, layers, and categorizations used to describe the components in FIG. 1A may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since each VMM includes the hardware emulation components for the virtual machine.

Figure 1B:
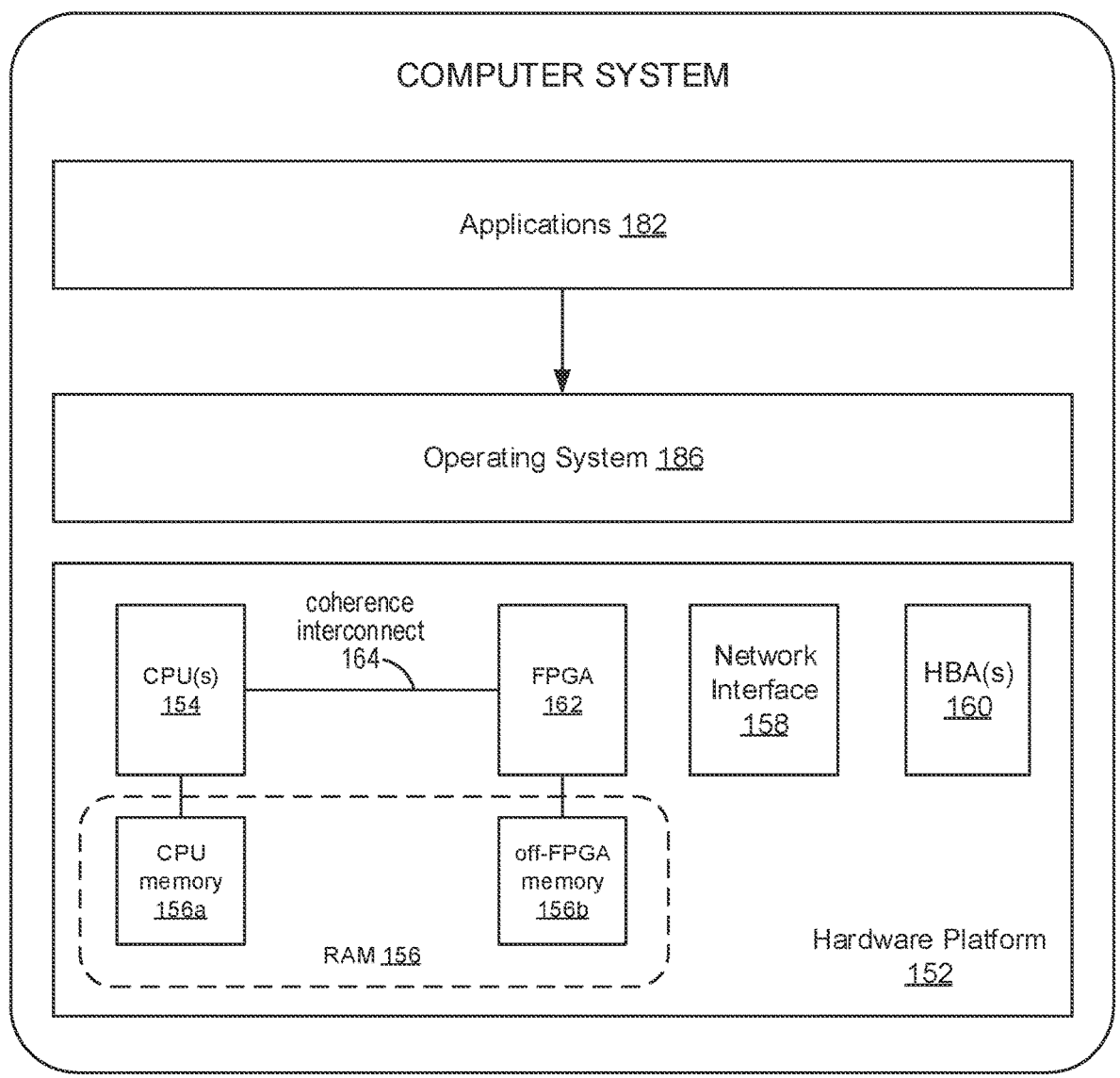
FIG. 1B depicts a block diagram of a computer system that is representative of a non-virtualized computer architecture in which embodiments may be implemented.

FIG. 1B is a block diagram of a computer system that is representative of an alternative computer architecture in which embodiments may be implemented. As illustrated, computer system 150 includes a hardware platform 152 that is similar to hardware platform 102. Hardware platform 152 includes conventional computer hardware components, such as one or more items of processing hardware such as central processing units (CPUs) 154, random access memory (RAM) 156 as system memory, one or more network interfaces 158 for connecting to a network, and one or more host bus adapters (HBA) 110 for connecting to a storage system. In addition, hardware platform 152 includes an FPGA 162, which is installed in a CPU socket and communicates with one or more CPUs 154 via coherence interconnect 164. Coherence interconnect 164 may be any point-to-point coherence interconnect between processors such as those identified above for coherence interconnect 114. Though the following description has the FPGA occupying a CPU socket, the embodiments are not so limited; any arrangement of the FGPA that includes a connection to the coherence interconnect among processors present in computer system 150 is sufficient. Hardware platform 152 supports the installation of an operating system 186, on top of which applications 182 are executed in computer system 150. Examples of an operating system 186 include any of the well-known commodity operating systems, such as the Microsoft Windows® operating system, the Linux® operating system, and the like.

Figure 2:
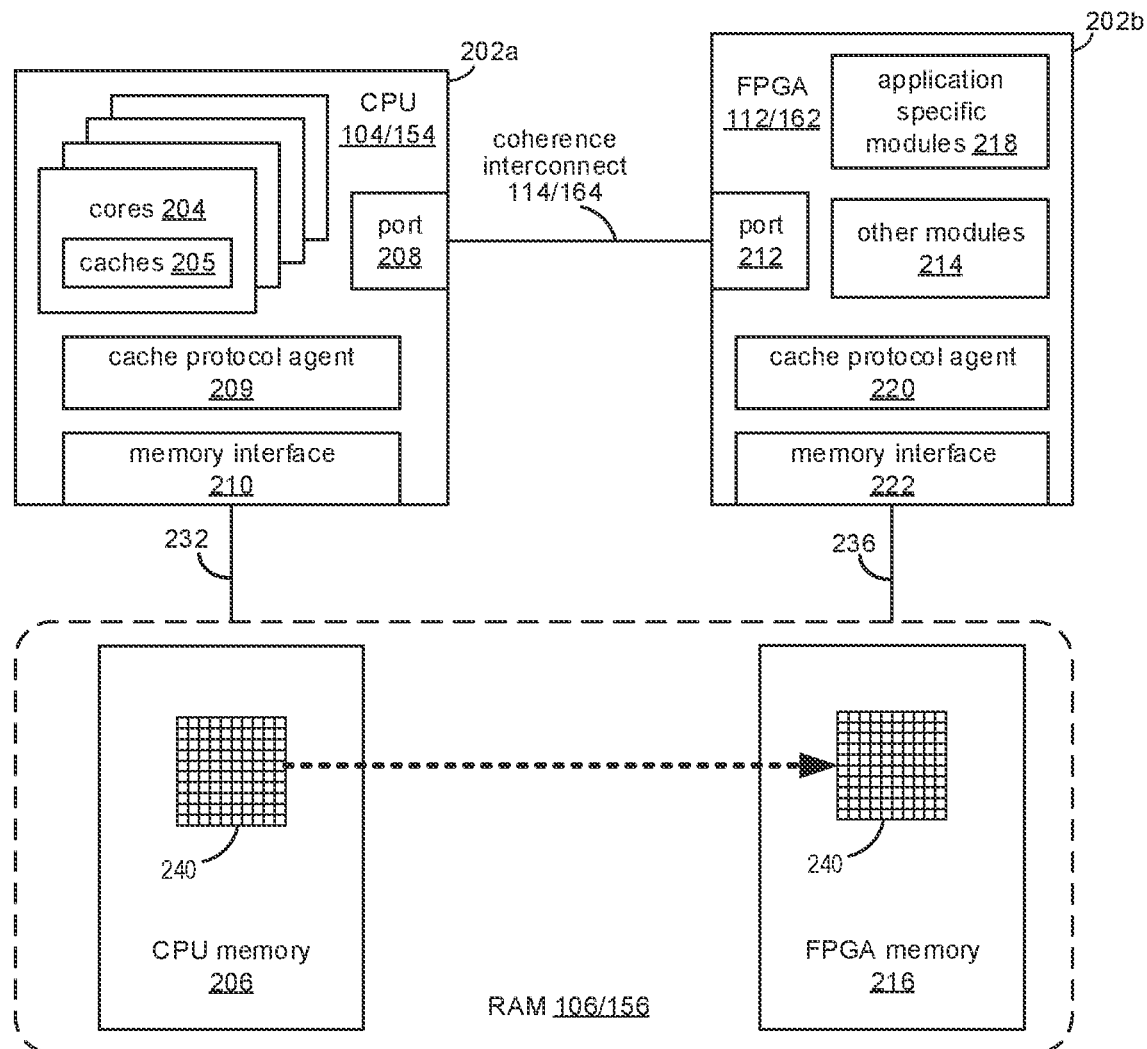
FIG. 2 depicts a block diagram of a pair of CPU sockets for a CPU and an FPGA, in an embodiment.

FIG. 2 depicts a block diagram of a pair of CPU sockets, a first socket 202a for a representative one of CPUs 104 (or CPUs 154), and a second socket 202b for an FPGA (e.g., FPGA 112 or FPGA 162). The CPU includes one or more processing cores 204, caches 205 for cores 204 (often implemented as a hierarchy of multiple cache levels), a cache protocol agent 209 for enforcing the cache coherence protocol, a communications port 208 connected to a coherence interconnect (e.g., coherence interconnect 114 or coherence interconnect 164), and a memory interface 210 connected via memory bus 232 to CPU memory 206, which is allocated from RAM 106 or RAM 156. The FPGA is configured with one or more application-specific modules 218, a cache protocol agent 220 for enforcing the cache coherence protocol, a communications port 212 connected to coherence interconnect 114, 164, and a memory interface 222 connected via memory bus 236 to FPGA memory 216, which is allocated from RAM 106 or RAM 156. Other modules 214, whose operations are unrelated to application-specific modules 218, also may be configured in FPGA 112. In one embodiment, each CPU socket, 202a, 202b, represents a separate Non-Uniform Memory Access (NUMA) domain.

In the embodiments, page tables 240 of VMs or applications running in a host that rely on remote memory accesses are moved from CPU memory 206 to FPGA memory 216. Having the page tables in FPGA memory 216 enables the FPGA to track all of the CPU accesses to cache lines containing page table data and prefetch from remote memory the pages of data referenced by the page table data contained in the accessed cache lines. In addition, the FPGA maintains a list of the accessed data pages, determines access patterns from the list, and formulates future requests to prefetch data pages from remote memory based on the access patterns.

As is well known, caches 205 are used to reduce the average cost to access data from memory. Data is transferred between CPU memory 206 and caches 205 in blocks of fixed size, called cache lines or cache blocks. When a cache line is copied from CPU memory 206 into caches 205, a cache entry is created, which includes both the copied data and the requested memory location (called a tag). When the CPU requests to read or write a location in CPU memory 206, caches 205 first check for a corresponding entry contained therein. That is, caches 205 search for the contents of the requested memory location in any cache lines that might contain that address. If the CPU finds that the memory location resides in caches 205, a cache hit has occurred, and the CPU immediately reads or writes the data in the cache line. However, if the CPU does not find the memory location in caches 205, a cache miss has occurred. For a cache miss, caches 205 allocate a new entry and copy data from CPU memory 206. The request is then fulfilled from the contents of caches 205.

Communication ports 208, 212, mentioned above, support a coherence protocol, which is designed to maintain cache coherence in a system with many processors, each having its own cache or caches. With the FPGA residing in one socket 202b of the CPU sockets and having its own communication port 212 that supports the coherence protocol, the FPGA can monitor and participate in the coherency protocol that keeps the processor caches coherent.

Cache coherence on the coherence interconnect is maintained according to a standard coherence protocol, such as modified, exclusive, shared, invalid (MESI) protocol or modified, exclusive, shared, invalid, forwarded (MESIF) protocol. In these protocols, cache lines marked invalid signify that the cache line has invalid data, and fresh data must be brought into caches 205 from CPU memory 206. Cache lines marked exclusive, shared, and forwarded (in the MESIF protocol) all signify that the cache line has valid data, but the cache line is clean (not modified), so the cache line can be discarded from the cache without writing data of the cache line back to CPU memory 206. A cache line marked as modified signifies the cache line is modified or dirty, and data of the cache line must be written back to CPU memory 206 before the cache line is discarded from caches 205.

Each cache protocol agent can initiate and respond to transactions on the coherence interconnect by sending and receiving messages on the coherence interconnect. In the embodiments illustrated herein, cache protocol agent 209 cooperates with cache protocol agent 220 by sending messages, including broadcast messages, over the coherence interconnect. In the protocol, one of the cache protocol agents is an owner of a set of cache lines and contains information regarding those cache lines. The other cache protocol agents send messages to the owner agent requesting a cache line or to find the status of the cache line owned by the owner agent. The owner agent may service the request directly or request that another cache protocol agent satisfy the request.

When the CPU accesses a cache line that is not in its caches 205, at any level of the cache hierarchy, it is cache protocol agent 209 of the CPU that requests the cache line from CPU memory 206. Thus, cache protocol agent 209 in CPU 104 issues a load cache line transaction on the coherence interconnect. The transaction can be 'Load Shared' for sharing the cache line or 'Load Exclusive' for cache lines that will be modified. A cache line that is loaded as 'Shared' means that the line probably will not be modified. In contrast, a cache line that is loaded as 'Exclusive' is considered potentially dirty because it is not certain the cache line will be modified. When a cache line gets evicted from caches 205 to CPU memory 206, if it is modified, it must be written back to CPU memory 206 from which it originated. The operation of writing the cache line is performed on the coherence interconnect as a write-back transaction and can be monitored for tracking dirty cache lines. In the case of a write-back transaction, the cache line is actually dirty rather than potentially dirty. In the description that follows, a writeback transaction is converted to and handled as a message, 'WB_Data_CL.'

To confirm whether a cache line is dirty or not, a cache protocol agent, such as cache protocol agent 220 in the FPGA, can snoop the cache line in accordance with the coherence interconnect protocol. If the cache line is dirty, the snoop triggers a write-back transaction, thereby exposing the dirty cache line that was residing in the processor cache. Cache protocol agents 209 and 220 also have information regarding the cache lines that are resident in the processor caches. This information is accessible via the coherence interconnect.

Figure 3:
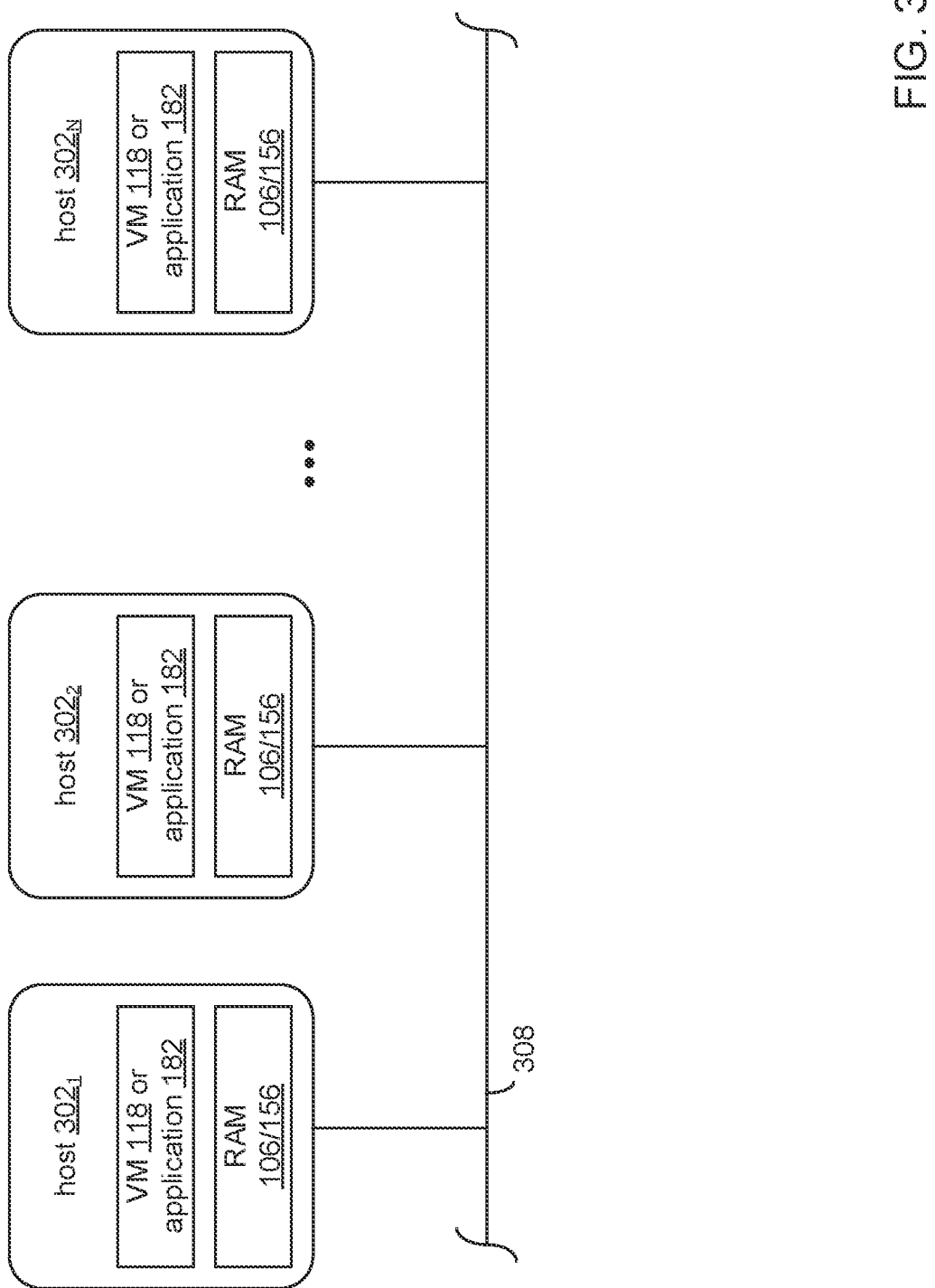
FIG. 3 depicts a plurality of hosts connected to each other for memory pooling.

FIG. 3 depicts a plurality of hosts $302_{1-N}$ that are running a VM 118 as in computer system 100 of FIG. 1A or an application 182 as in computer system 150 of FIG. 1B. Each host 302 includes system memory (e.g., RAM 106 or 156) and is interconnected to the other hosts by a network 308, which can be a local area network or a wide area network. For purposes of illustration, it is assumed that the system memory of the plurality of hosts $302_{1-N}$ is pooled for sharing, and a VM or an application running in host $302_2$ depends on pages of memory that are not present on host $302_2$ but contained in one or more other hosts $302_1$ and $302_{3-N}$, each of which is hereinafter referred to as a remote host.

In the embodiments described below, the VM or the application that relies on pages of memory contained in a remote host is referred to as an application program. The host that is running the application program is referred to as a local host, and the hypervisor or the operating system running in the local host is referred to as system software.

Figure 4:
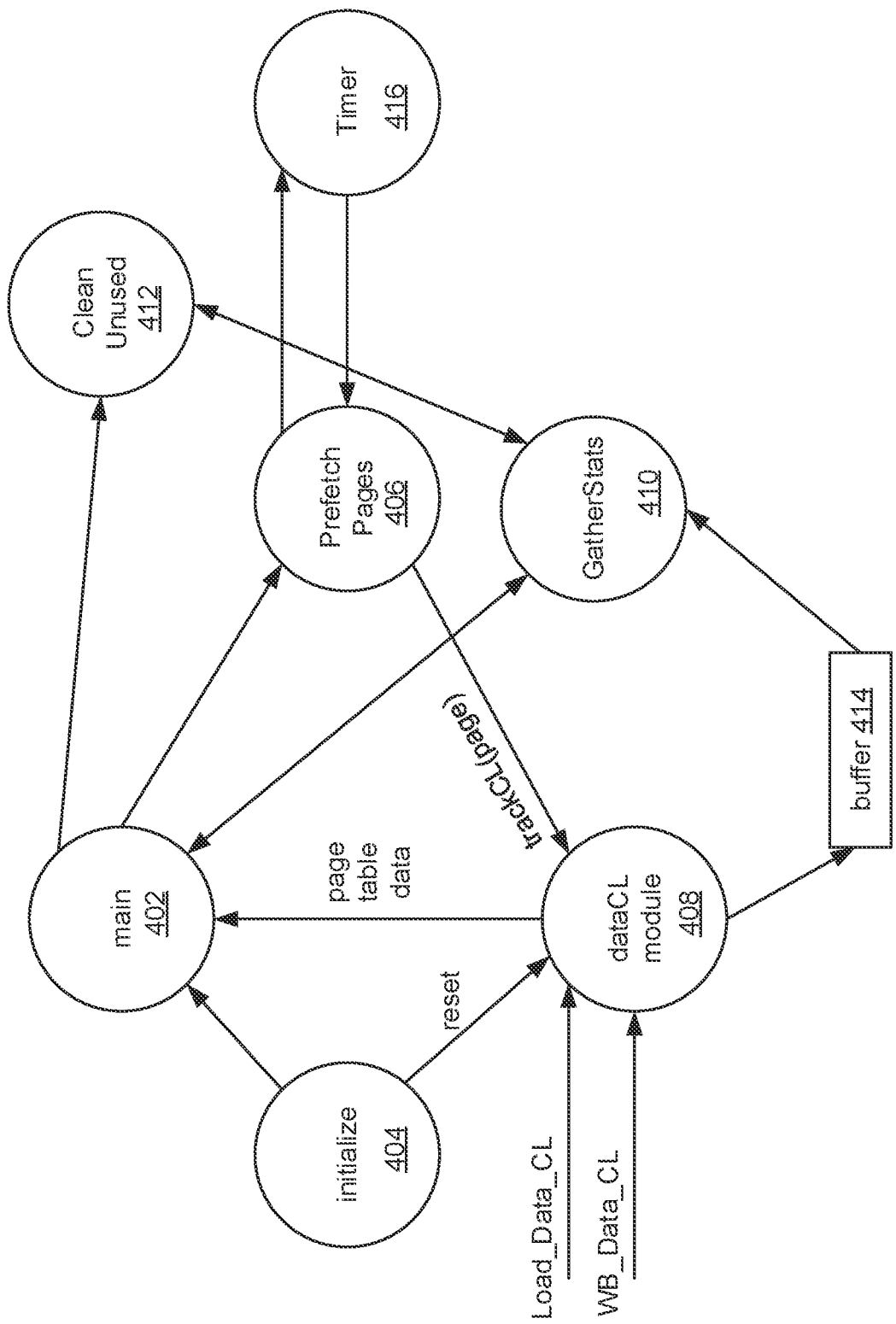
FIG. 4 depicts the components involved in an operation to fetch pages of memory from a remote host

FIG. 4 depicts the components involved in an operation to fetch pages of memory from a remote host. The components include a main program 402 and several functions, which include an initialize function 404 (described in reference to FIG. 5), a Prefetch Pages function 406 (described in reference to FIG. 6), a Gather Statistics (GatherStats) function 410 (described in reference to FIG. 8), a Clean Unused function 412 (described in reference to FIG. 9), a dataCL module 408, a buffer 414, and a timer 416. Timer 416 is set with a timer period during which a fetch of a page is expected to complete and to have a value less than a timeout interval of the coherence interconnect. In one embodiment, the timeout interval is determined from empirically observations of cache-line accesses on the coherence interconnect. Without the timer, if there is a delay in fetching of the page, the cache coherence interconnect and cache protocol agents may time out, which would cause a machine check exception (MCE). The MCE would then be handled by the hypervisor, but handling the MCE is costly and may shut down the host. On the other hand, with timer 416, if a fetch of a page does not complete within the time period of the timer, the presence bit for the page is set to indicate that the page is not present. If the CPU tries to access the missing page, an exit to the hypervisor occurs, and the hypervisor handles the missing page as a normal page fault.

Figure 10:
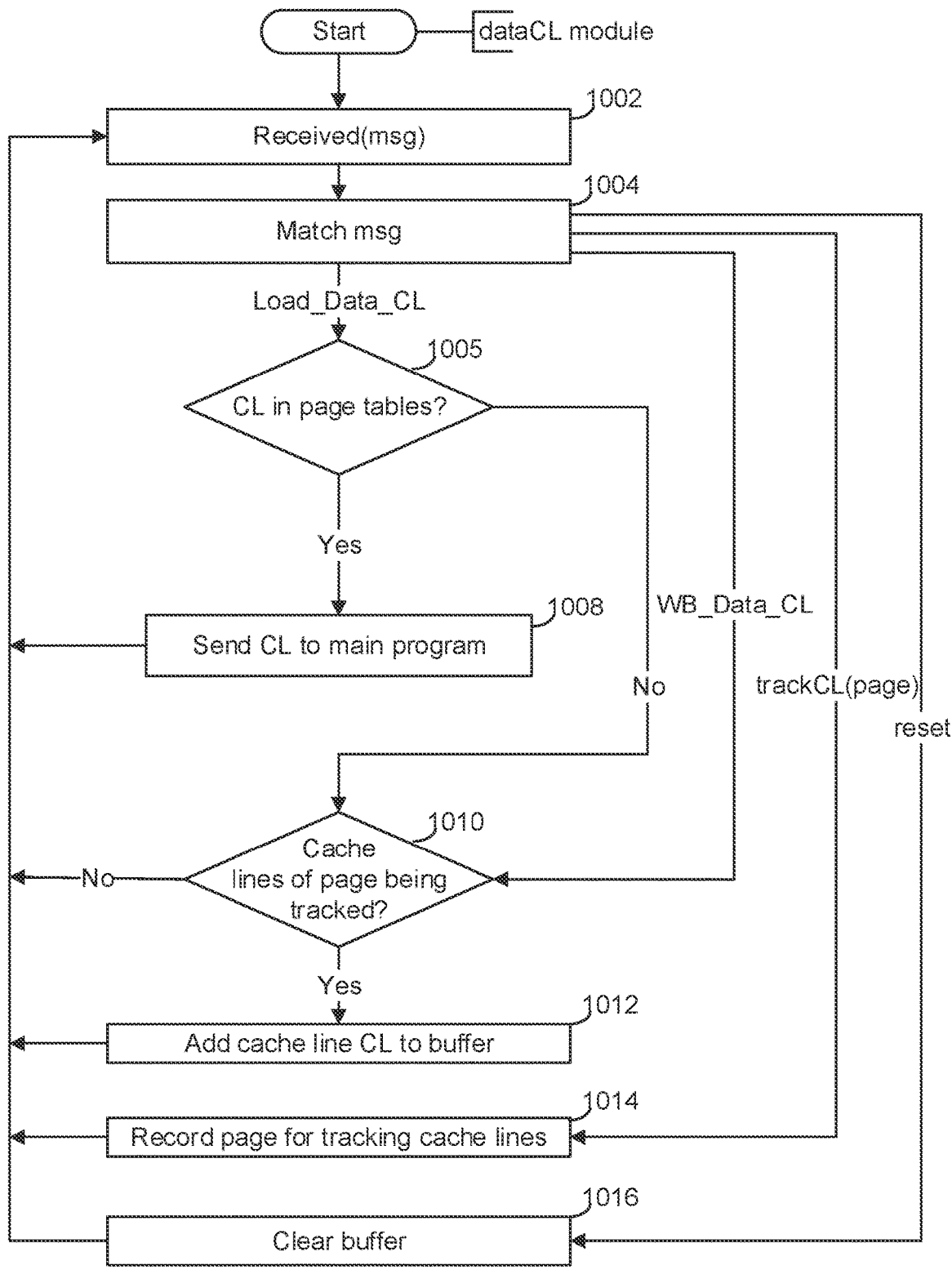
FIG. 10 depicts a flow of operations of a module that listens to activity on a coherence interconnect.

DataCL module 408, further described in reference to FIG. 10, listens to activity on the coherence interconnect, such activity including a 'Load_Data_CL' event and a 'WB_Data_CL' event. The Load_Data_CL event indicates that a cache line is loaded into a CPU cache and the 'WB_Data_CL' event indicates that a cache line of the CPU cache is written back to system memory. DataCL module 408 may also receive a trackCL(page) command, which tells dataCL module 408 to track any cache line, loaded or written back, in the specified page. Any cache line that is tracked is added to buffer 414 so that any patterns among the tracked cache lines can be detected. In one embodiment, dataCL module 408 is one of the application-specific modules 218 configured in the FPGA, and buffer 414 is configured in FPGA memory 216.

Figure 5:
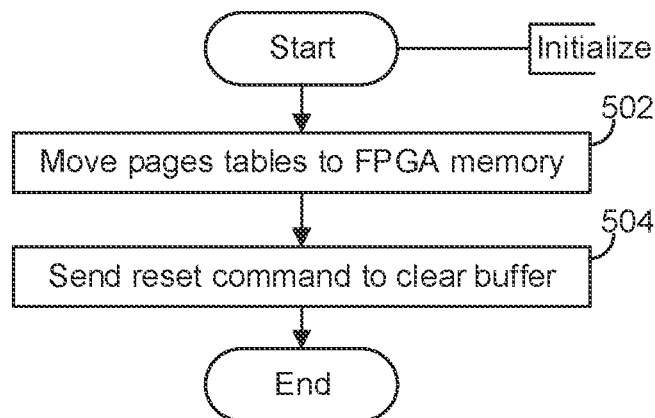
FIG. 5 depicts a flow of operations for an initializing an application program to prefetch memory pages from remote memory according to embodiments.

FIG. 5 depicts a flow of operations for an initialize function, which is executed by system software running in the local host when an application program is allocated remote memory. The initialize function in step 502 moves all of the page tables of the application program from CPU memory 206 to FPGA memory 216. As a result, when the CPU accesses a cache line from page table data, the cache-line access appears as a 'Load_Data_CL' event on the coherence interconnect, and dataCL module 408 is able to recognize that the cache line is for page table data. In step 504, the initialize function sends a reset command to clear buffer 414.

Figure 6:
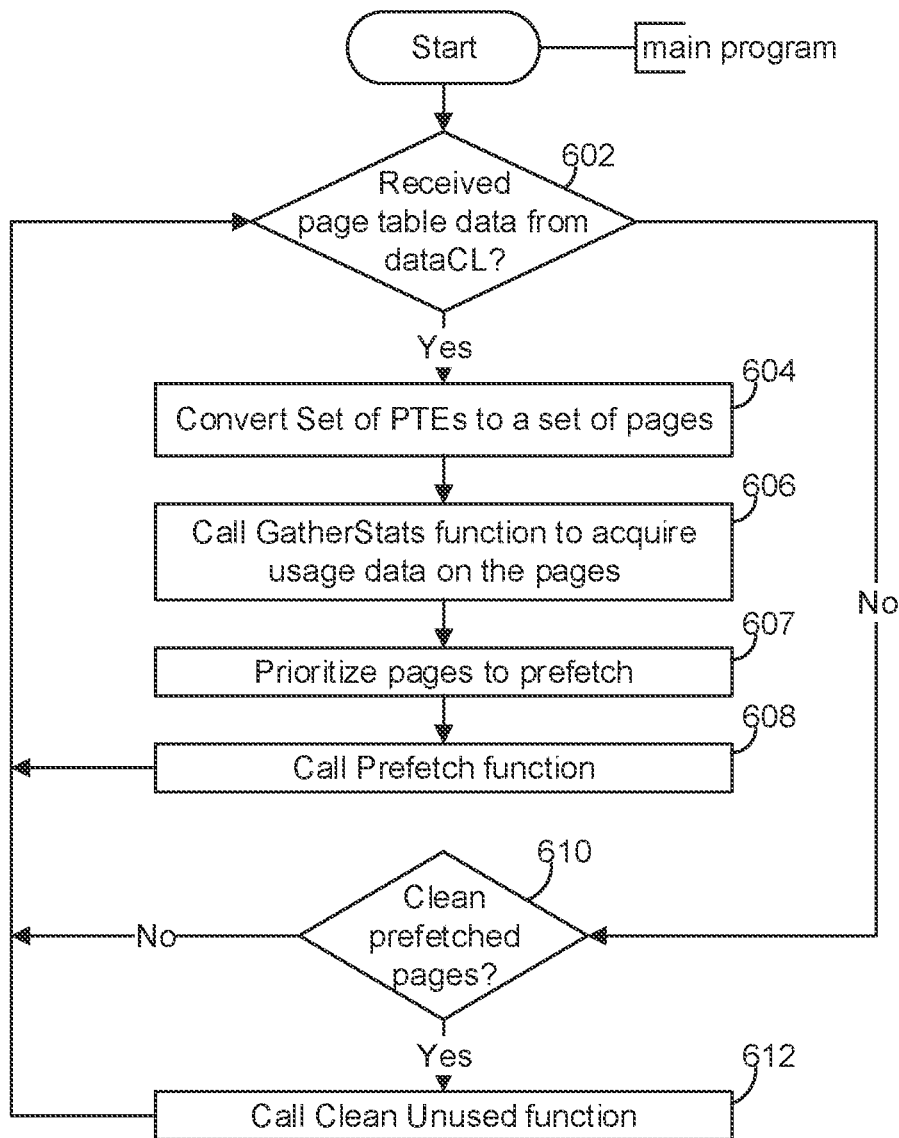
FIG. 6 depicts a flow of operations of a main program for managing the process to prefetch memory pages from remote memory according to embodiments.

FIG. 6 depicts a flow of operations of a main program, which is executed as one of application-specific modules 218 running in the local host for managing the prefetching process. The main program awaits the receipt of a cache line containing page table data from dataCL module 408 in step 602. Upon receipt, the main program converts the page table data to a set of data pages referenced by the page table data in step 604. In step 606, the main program calls the GatherStats function to acquire usage data on the data pages of the application program. Based on the usage data, which in the embodiments illustrated herein is the number of cache-line accesses per data page, the main program in step 607 prioritizes the data pages to prefetch. In one embodiment, the main program assigns a higher fetching priority to data pages with a higher number of cache-line accesses. During the initial stages of executing the application program, step 607 may be skipped and replaced with a prioritization scheme based on whether or not the accessed bit for any of the data pages is set. The main program assigns a higher priority to the data pages having the accessed bit set and a lower priority to the data pages that do not have the accessed bit set. In step 608, the main program calls the Prefetch function with the set of pages to be fetched that are prioritized as described above.

While waiting for the receipt of a cache line containing page table data from dataCL module 408 in step 602, the main program determines in step 610 whether or not the condition for cleaning prefetched data pages that are unused is satisfied. The condition may be an expiration of a time interval that is set upon initialization of the application program, and each time the Clean Unused function is called in step 612 to remove prefetched data pages that are unused.

Figure 7:
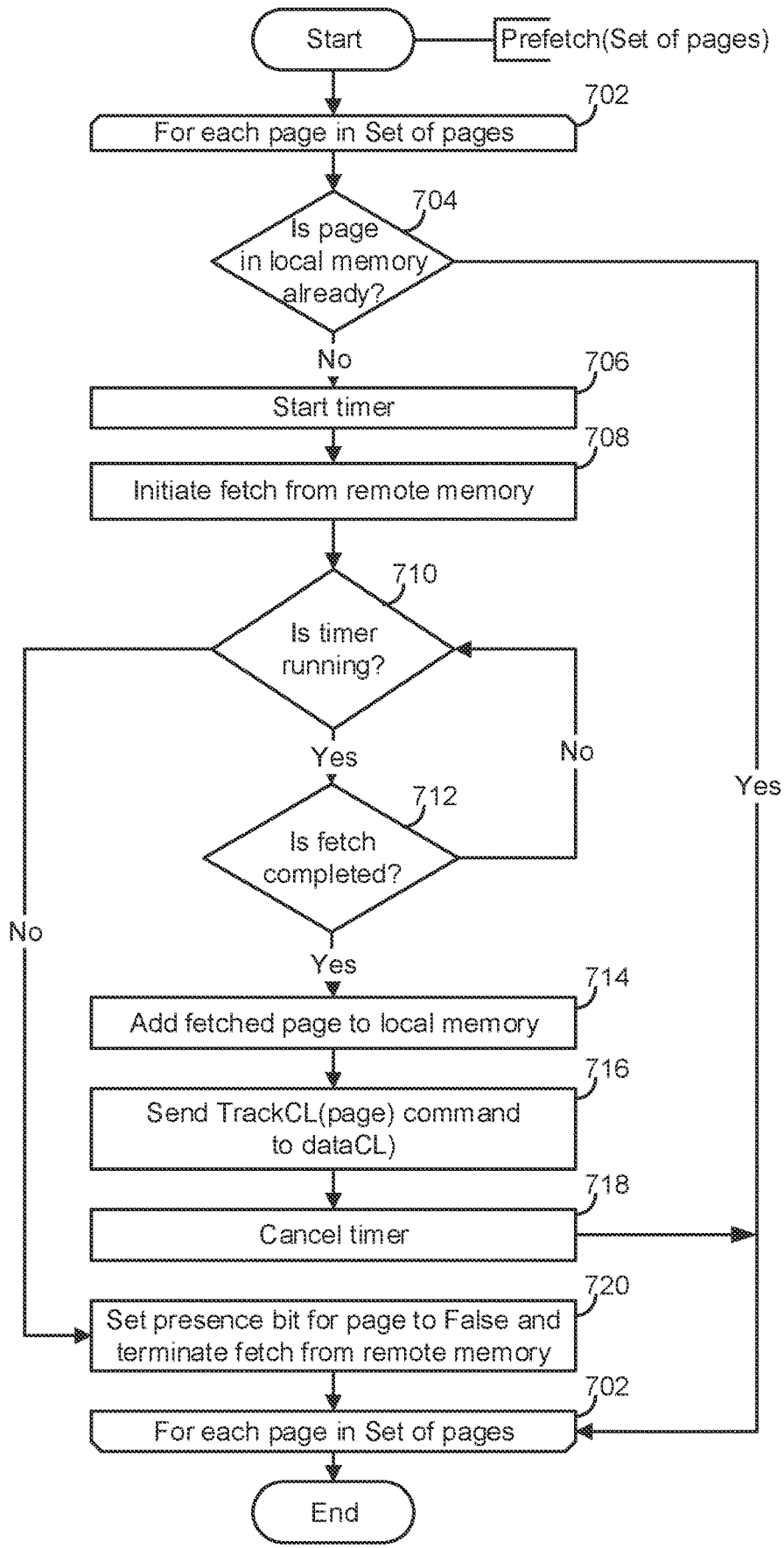
FIG. 7 depicts a flow of operations of a function to prefetch memory pages from remote memory.

FIG. 7 depicts a flow of operations of the Prefetch function, which is executed as one of application-specific modules 218 running in the local host. The Prefetch function is called by the main program with a set of data pages that are ordered based on their priority. The Prefetch function iterates in step 702 over each data page in the set. In step 704, the Prefetch function determines if the data page has been fetched into local memory already. If not, the Prefetch function starts a timer in step 706 and initiates the fetch of the data page in step 708. In steps 710 and 712, the Prefetch function determines whether the fetch completes while the timer is still running. If so (step 710: Yes; step 712: Yes), the Prefetch function adds the fetched data page to the local memory in step 714. In step 716, the Prefetch function sends a TrackCL(page) command to the dataCL module to cause cache lines of the fetched data page to be tracked. In step 718, the Prefetch function cancels the timer (if it is still running) and steps to the next page in the iteration in step 702.

Continuing with FIG. 7, if the timer expires and the fetch has not completed (step 710: No; step 712: No), the Prefetch function sets the presence bit for the page to False in step 720 and terminates the fetch from remote memory to prevent a machine check error. The Prefetch function then steps to the next page in the set of pages in step 702.

In one embodiment, the Prefetch function may be multi-threaded so that the Prefetch function can run concurrently for each page in the set of pages. Concurrent running of the function allows concurrent fetching from multiple remote hosts to obtain the required data pages.

Figure 8:
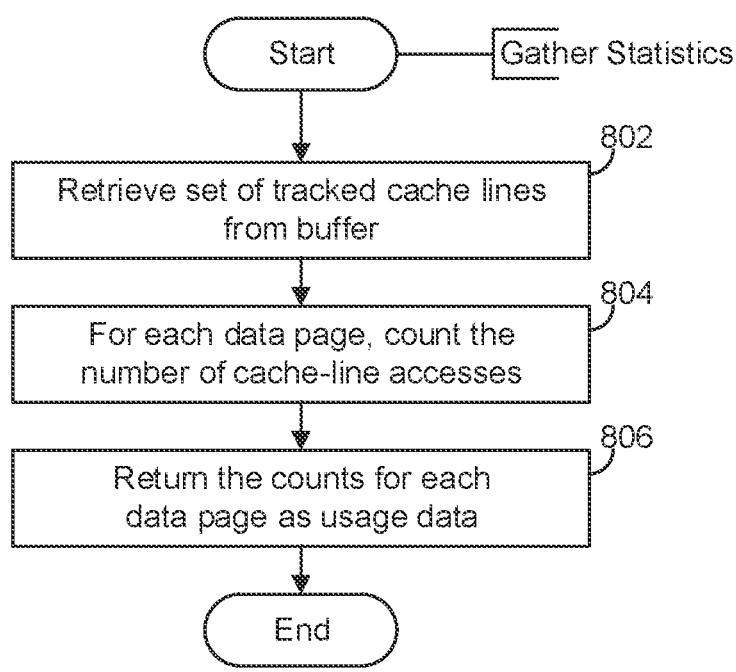
FIG. 8 depicts a flow of operations of a function to gather statistics about prefetched memory pages.

FIG. 8 depicts a flow of operations of the GatherStats function, which is executed as one of application-specific modules 218 running in the local host. In step 802, the GatherStats function retrieves a set of tracked cache lines from buffer 414. In step 804, the GatherStats function counts the number of cache-line accesses for each data page that is being tracked by dataCL module 408. In step 806, the GatherStats function returns the counts for each data page as usage data to the caller.

Figure 9:
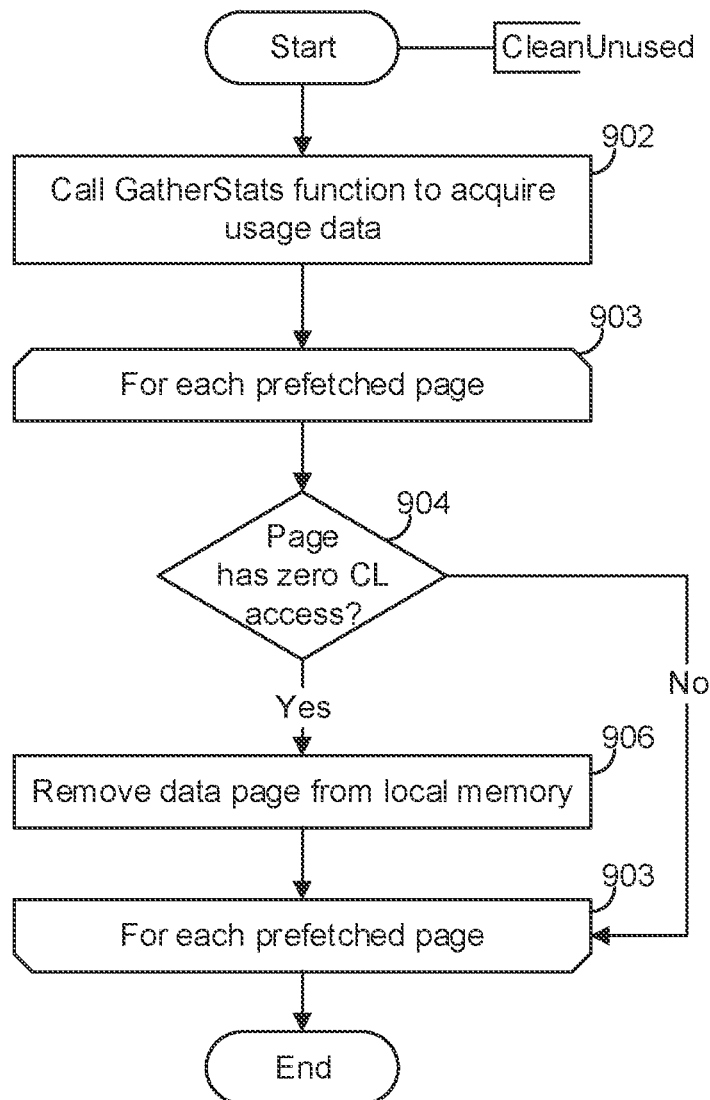
FIG. 9 depicts a flow of operations of a function to clean unused memory pages that have been prefetched.

FIG. 9 depicts a flow of operations of the Clean Unused function, which is executed as one of application-specific modules 218 running in the local host. In step 902, the Clean Unused calls the GatherStats function to acquire usage data on the data pages of the application program. The GatherStats function iterates in step 903 over each prefetched data page. If the prefetched data page has had zero cache-line accesses (step 904; Yes), the data page is removed from FPGA memory 216 of the local host in step 906.

FIG. 10 depicts a flow of operations of the dataCL module, which is one of application-specific modules 218 running in the local host. The operations begin in step 1002, when dataCL module 408 receives a message on the coherence interconnect or from one of the other functions. Then, in step 1004, dataCL module 408 matches the message to one of two events on the coherence interconnect or to a message sent from other functions.

If the message is a Load_Data_CL event, step 1005 is executed. In step 1005, the dataCL module tests whether the cache line being accessed is a cache line is page table data, which is stored in page tables 240 that have been moved into FPGA memory 216. If so (step 1005; Yes), it returns the cache line to main program 402 in step 1008. Otherwise (step 1005; No), it checks to see if it is the cache line of a data page that is being tracked (step 1010). If the cache line is of a data page that is being tracked (step 1010; Yes), the dataCL module adds the cache line to buffer 414 in step 1012 and returns to step 1002 to wait for the next message. If not (step 1010; No), step 1012 is skipped, and the dataCL module returns to step 1002 to wait for the next message.

If the message is a WB_Data_CL event, the dataCL module proceeds to step 1010 directly and executes step 1010 to see if it the cache line of a data page that is being tracked. As described above, if the cache line is of a data page that is being tracked (step 1010; Yes), the dataCL module adds the cache line to buffer 414 in step 1012 and returns to step 1002 to wait for the next message. If not (step 1010; No), step 1012 is skipped, and the dataCL module returns to step 1002 to wait for the next message.

If the message is a trackCL command, dataCL module 408 executes step 1014 to record the data page identified in the trackCL command as a data page for which cache-line accesses are to be tracked by dataCL module 408. After step 1014, dataCL module 408 returns to step 1002 to wait for the next message.

If the message is a reset command, then dataCL module 408 clears buffer 414 in step 1016. After step 1016, dataCL module 408 returns to step 1002 to wait for the next message.

Certain embodiments as described above involve a hardware abstraction layer on top of a host computer. The hardware abstraction layer allows multiple contexts to share the hardware resource. These contexts are isolated from each other in one embodiment, each having at least a user application program running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application program runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application program and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application program's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and 1/0.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A computer system for prefetching pages from a remote memory, the system comprising:
   a processor installed in a first CPU socket and executing an application program;
   a local memory; and
   a field programmable gate array (FPGA) installed in a second CPU socket and connected to the processor via a coherence interconnect, wherein the FPGA is configured to:
      detect on the coherence interconnect that a cache-line access made by the processor executing the application program is an access to a cache line containing page table data of the application program;
      identify data pages that are referenced by the page table data;
      initiate a fetch of a data page, which is one of the identified data pages; and
      store the fetched data page in the local memory.

2. The computer system of claim 1, wherein the FPGA is further configured to:
   assign priorities to the identified data pages, wherein a fetch of the identified data pages are to be initiated in the order of the assigned priorities.

3. The computer system of claim 2, wherein the FPGA is further configured to:
   track cache-line accesses to the identified data pages, wherein the priorities to the identified data pages are assigned based on the number of cache-line accesses.

4. The computer system of claim 3, wherein the identified data pages having a higher number of cache-line accesses relative to the other identified data pages are assigned a higher priority than the other identified data pages.

5. The computer system of claim 1, wherein the FPGA is further configured to:
   track cache-line accesses to the identified data pages that have been fetched and stored in the local memory;
   determine that some of the identified data pages are unused based on the cache-line accesses; and
   remove the identified data pages that are determined to be unused from the local memory.

6. The computer system of claim 5, wherein the local memory includes a first local memory of the processor and a second local memory of the FPGA and the identified data pages are removed from the second local memory.

7. The computer system of claim 1, wherein
   the coherence interconnect has a timeout interval, and
   the FPGA is further configured to store in the local memory additional data pages that are fetched within the timeout interval of the coherence interconnect.

8. A method of prefetching pages from a remote memory for a processor installed in a first CPU socket, by a field programmable gate array (FPGA) installed in a second CPU socket and connected to the processor via a coherence interconnect, the method comprising:
   detecting on the coherence interconnect that a cache-line access made by the processor executing an application program is an access to a cache line containing page table data of the application program;
   identifying data pages that are referenced by the page table data;
   initiating a fetch of a data page, which is one of the identified data pages; and
   storing the fetched data page in a local memory.

9. The method of claim 8, further comprising:
   assigning priorities to the identified data pages, wherein a fetch of the identified data pages are to be initiated in the order of the assigned priorities.

10. The method of claim 9, further comprising:
    tracking cache-line accesses to the identified data pages, wherein the priorities to the identified data pages are assigned based on the number of cache-line accesses.

11. The method of claim 10, wherein the identified data pages having a higher number of cache-line accesses relative to the other identified data pages are assigned a higher priority than the other identified data pages.

12. The method of claim 8, further comprising:
tracking cache-line accesses to the identified data pages that have been fetched and stored in the local memory;
determining that some of the identified data pages are unused based on the cache-line accesses; and
removing the identified data pages that are determined to be unused from the local memory.

13. The method of claim 12, wherein the local memory includes a first local memory of the processor and a second local memory of the FPGA and the identified data pages are removed from the second local memory.

14. The method of claim 8, wherein
the coherence interconnect has a timeout interval, and
additional data pages that are fetched within the timeout interval of the coherence interconnect are stored in the local memory.

15. A non-transitory computer-readable medium comprising instructions to be executed in a field programmable gate array (FPGA) that is connected to a processor executing an application program, wherein the processor is installed in a first CPU socket and the FPGA is installed in a second CPU socket and connected to the processor via a coherence interconnect, and the instructions, when executed in the FPGA, causes the FPGA to carry out a method of prefetching pages from a remote memory, the method comprising:
detecting on the coherence interconnect that a cache-line access made by the processor executing the application program is an access to a cache line containing page table data of the application program;
identifying data pages that are referenced by the page table data;
initiating a fetch of a data page, which is one of the identified data pages; and
storing the fetched data page in a local memory.

16. The non-transitory computer-readable medium of claim 15, the method further comprising:
assigning priorities to the identified data pages, wherein a fetch of the identified data pages are to be initiated in the order of the assigned priorities.

17. The non-transitory computer-readable medium of claim 16, the method further comprising:
tracking cache-line accesses to the identified data pages, wherein the priorities to the identified data pages are assigned based on the number of cache-line accesses.

18. The non-transitory computer-readable medium of claim 17, wherein the identified data pages having a higher number of cache-line accesses relative to the other identified data pages are assigned a higher priority than the other identified data pages.

19. The non-transitory computer-readable medium of claim 15, the method further comprising:
tracking cache-line accesses to the identified data pages that have been fetched and stored in the local memory;
determining that some of the identified data pages are unused based on the cache-line accesses; and
removing the identified data pages that are determined to be unused from the local memory.

20. The non-transitory computer-readable medium of claim 15, wherein
the coherence interconnect has a timeout interval, and
additional data pages that are fetched within the timeout interval of the coherence interconnect are stored in the local memory.

* * * * *